(12) United States Patent
Wei et al.

(10) Patent No.: US 11,755,649 B2
(45) Date of Patent: *Sep. 12, 2023

(54) DATA INDEXING FOR SEARCH TOOL

(71) Applicant: Palantir Technologies Inc., Denver, CO (US)

(72) Inventors: Tao Wei, London (GB); Subbanarasimhiah Harish, London (GB); Neil Rickards, Hertfordshire (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,712

(22) Filed: May 3, 2022

(65) Prior Publication Data

US 2022/0261437 A1    Aug. 18, 2022

Related U.S. Application Data

(63) Continuation of application No. 16/054,342, filed on Aug. 3, 2018, now Pat. No. 11,321,395.

(30) Foreign Application Priority Data

Oct. 4, 2017   (GB) ...................................... 1716171

(51) Int. Cl.
*G06F 16/903* (2019.01)
*G06F 16/951* (2019.01)
(Continued)

(52) U.S. Cl.
CPC ............ *G06F 16/903* (2019.01); *G06F 9/547* (2013.01); *G06F 16/13* (2019.01); *G06F 16/901* (2019.01); *G06F 16/951* (2019.01)

(58) Field of Classification Search
CPC .... G06F 16/903; G06F 16/901; G06F 16/951; G06F 16/13; G06F 9/547
See application file for complete search history.

(56) References Cited

U.S. PATENT DOCUMENTS 8,090,684 B2   1/2012  Ghosh
9,672,233 B2   6/2017  Madany et al.
(Continued)

OTHER PUBLICATIONS

Extended European Search Report for EP Application No. 18187361.3 dated Jan. 8, 2019, 8 pages.

*Primary Examiner* — Alicia M Willoughby
(74) *Attorney, Agent, or Firm* — Sheppard Mullin Richter & Hampton LLP

(57) ABSTRACT

Methods and systems for indexing data for a search tool are disclosed, wherein the method is performed using one or more processors. The methods and systems may comprise an operation of providing an indexing application programming interface (API) for implementation in relation to one or more data resources of a data processing platform requiring data of the data resource to be indexed for searching using a search tool of the data processing platform. The interface may be configured, when implemented in relation to a data resource, to send data indicative of one or more definitions of data to be crawled from said data resource to an indexing system of the data processing platform, and to generate an event queue indicative of one or more events associated with said defined data that have occurred in relation to the data resource.

20 Claims, 11 Drawing Sheets

(51) Int. Cl.
*G06F 16/901* (2019.01)
*G06F 16/13* (2019.01)
*G06F 9/54* (2006.01)

(56) References Cited

U.S. PATENT DOCUMENTS

| | | | |
|---|---|---|---|
| 2008/0082490 A1* | 4/2008 | MacLaurin | G06F 16/951 |
| 2015/0112996 A1* | 4/2015 | Mishra | G06F 16/134 |
| | | | 707/741 |
| 2015/0242508 A1* | 8/2015 | Brawer | G06F 16/951 |
| | | | 707/709 |
| 2016/0321264 A1* | 11/2016 | Neagovici-Negoescu | |
| | | | H04L 67/01 |
| 2017/0351226 A1* | 12/2017 | Bliss | G05B 19/4063 |
| 2019/0018870 A1* | 1/2019 | Bhagwat | G06F 16/2228 |

\* cited by examiner

DATA INDEXING FOR SEARCH TOOL

CROSS REFERENCE OF RELATED APPLICATIONS

This application is a continuation of U.S. patent application Ser. No. 16/054,342, filed Aug. 3, 2018, which claims the benefit of United Kingdom Application Number 1716171.2, filed Oct. 4, 2017, the content of which is incorporated by reference in its entirety into the present disclosure.

FIELD OF THE DISCLOSURE

The present disclosure relates to a method and systems for data indexing for a search tool, for example data indexing for a search engine associated with a data processing platform, for example a cloud-based data processing platform storing and executing multiple data resources for multiple users.

BACKGROUND

Cloud computing is a computing infrastructure for enabling ubiquitous access to shared pools of servers, storage, computer networks, applications and data resources, which can be rapidly provisioned, often over the Internet.

A data resource in this context may be any form of executable software, data set, or data structure usually, but not exclusively for providing a service, for example a data analysis application, a data transformation application, a report generating application, a machine learning process, a spreadsheet or a database.

Some companies provide cloud computing services for registered customers, for example manufacturing and technology companies, to create, store, manage and execute their own data resources. Sometimes, these data resources may interact with other software resources, for example those provided by the cloud platform provider.

For example, an engine manufacturer may create and store a database relating to spare parts for the different models of engines it produces and services. The database may, for example, be a multi-dimensional relational database. The engine manufacturer may also create one or more data analysis applications for performing certain tasks on data held in the database, for example to analyse and/or transform the data in order to identify trends which may be useful for predicting when certain parts will fail and/or need replacing, and hence when to produce and deploy the spare parts.

The engine manufacturer may create and store one or more other databases, which may or may not be related to the spare parts database. One or more other organisations may store and run their own data resources on the same cloud platform. These other data resources may be partitioned from those of other organisations to ensure data security, confidentiality and integrity.

The cloud platform provider may provide a file system for users, for example external users, to view their own data resources and to perform functions such as data creation, data deletion, data modification, granting or revoking permissions, file viewing, file organisation, file execution, file association, file annotating, adding and/or removing metadata and so on. The file system may have an associated graphical user interface (GUI) which shows files as, for example, a list of selectable items in one or more windows, with associated metadata such as type of file, creation date, last edited date, file size and so on. Metadata is primarily data relating to other data, as will be appreciated. The file system may allow the files to be viewed in hierarchical format indicative of the location of files within higher directories or folders. The file system may also comprise one or more selectable functions which permit files to be viewed, executed and/or functions associated with the file system to be viewed.

The file system may comprise a search tool for users to enter one or more search terms to enable locating information relating to data resources. The search tool may comprise a dedicated text entry box provided as part of the file system GUI. Search terms are processed using a searching algorithm, which can be any known algorithm, against a database of indexed data. Based on the searching algorithm, a list of one or more search results are returned in a search results window.

The conventional method of data indexing is for the platform provider to provide a centralised crawling and indexing system which initiates periodic crawling of its users' data resources for indexing. The conventional method cannot be easily scaled, because each time a new data resource is added to the system, the centralised crawling system needs to be manually updated to address the new data resource. This may take a finite period of time, and introduce delays into the system. It also does not cater well for future types of data which may be stored and implemented on the cloud computing platform. It also places a heavy processing burden on the centralised system which may become slow and/or slow down processing of other services on the cloud computing service.

SUMMARY

According to an aspect, there is provided a method of indexing data for a search tool, wherein the method is performed using one or more processors, the method comprising: providing an indexing application programming interface (API) for implementation in relation to one or more data resources of a data processing platform requiring data of the data resource to be indexed for searching using a search tool of the data processing platform, the interface being configured, when implemented in relation to a data resource, to send data indicative of one or more definitions of data to be crawled from said data resource to an indexing system of the data processing platform, and to generate an event queue indicative of one or more events associated with said defined data that have occurred in relation to the data resource; identifying one or more data resources that have implemented the indexing API; querying the one or more identified data resources to determine one or more events indicated in their event queue; crawling the one or more identified data resources based on the determined one or more events to receive data for indexing; and indexing the received data associated with said one or more events for access by a search tool.

The indexing system may be a centralised indexing system of a cloud-based data processing platform comprising one or more servers running one or more data resources for each of a plurality of different users or organisations.

The indexing API may be a web API.

The indexing API, when implemented by a data resource, may be configured to cause creation of the event queue locally at said data resource.

Querying the one or more identified data resources may comprise identifying one or more new events in the one or more event queues which have occurred since a previous querying operation, and crawling the respective one or more data resources based only on the one or more new events.

The indexing API, when implemented by said one or more data sources, may be further configured to cause the respective one or more event queues to empty subsequent to the crawling operation.

The indexing API, when implemented by said one or more data sources, may be further configured to cause generation of an offset indicative of when the respective one or more event queues were previously queried.

The one or more event queues may store event data indicative of a change of data.

The event data may be indicative of one or more of new data, deleted data and modified data.

The one or more definitions of the data to be crawled may permit interpretation of the or each event in the event queue such that data associated with the interpreted event is indexed based on the interpretation.

The one or more definitions of the data to be crawled may comprise one or more schemas.

The method may further comprise providing a search tool specific to the data processing platform, the search tool comprising a user interface for receiving a user search query and for returning search results based on the user search query and the data that has been indexed by the indexing operation.

The indexing API may be operable, when implemented by the one or more data resources, to send a set of search restrictions defining limitations on the search results that can be returned to users responsive to a user search query.

The search restrictions may be based on an identifier of a user or user role associated with the user search query.

The search restrictions may define that search results relating to a particular organisation's data resource(s) may only be returned to users having a predetermined association with said organisation.

The search restrictions may define one or more of: (i) a subset of the indexed data can be returned to the user in the search results (ii) whether the search results can be accessed and (iii) the format of the search results.

The indexing API may be operable, when implemented by the one or more data resources, to send a set of indexing preferences to the indexing system indicative of user-defined data sub-types to be crawled and indexed.

The one or more data resources may comprise one or more of executable applications, data analysis applications, databases, metadata, documents.

According to an aspect, there may be provided a computer program, optionally stored on a non-transitory computer readable medium program which, when executed by one or more processors of a data processing apparatus, causes the data processing apparatus to carry out a method comprising providing an indexing application programming interface (API) for implementation in relation to one or more data resources of a data processing platform requiring data of the data resource to be indexed for searching using a search tool of the data processing platform, the interface being configured, when implemented in relation to a data resource, to send data indicative of one or more definitions of data to be crawled from said data resource to an indexing system of the data processing platform, and to generate an event queue indicative of one or more events associated with said defined data that have occurred in relation to the data resource; identifying one or more data resources that have implemented the indexing API; querying the one or more identified data resources to determine one or more events indicated in their event queue; crawling the one or more identified data resources based on the determined one or more events to receive data for indexing; and indexing the received data associated with said one or more events for access by a search tool.

According to an aspect, there may be provided an apparatus comprising one or more processors or special-purpose computing hardware configured: to provide an indexing application programming interface (API) for implementation in relation to one or more data resources of a data processing platform requiring data of the data resource to be indexed for searching using a search tool of the data processing platform, the interface being configured, when implemented in relation to a data resource, to send data indicative of one or more definitions of data to be crawled from said data resource to an indexing system of the data processing platform, and to generate an event queue indicative of one or more events associated with said defined data that have occurred in relation to the data resource; to identify one or more data resources that have implemented the indexing API; to query the one or more identified data resources to determine one or more events indicated in their event queue; to crawl the one or more identified data resources based on the determined one or more events to receive data for indexing; and to index the received data associated with said one or more events for access by a search tool.

BRIEF DESCRIPTION OF THE DRAWINGS

Example embodiments will now be described by way of non-limiting example with reference to the accompanying drawings, in which.

DETAILED DESCRIPTION OF CERTAIN EMBODIMENTS

Figure 1:
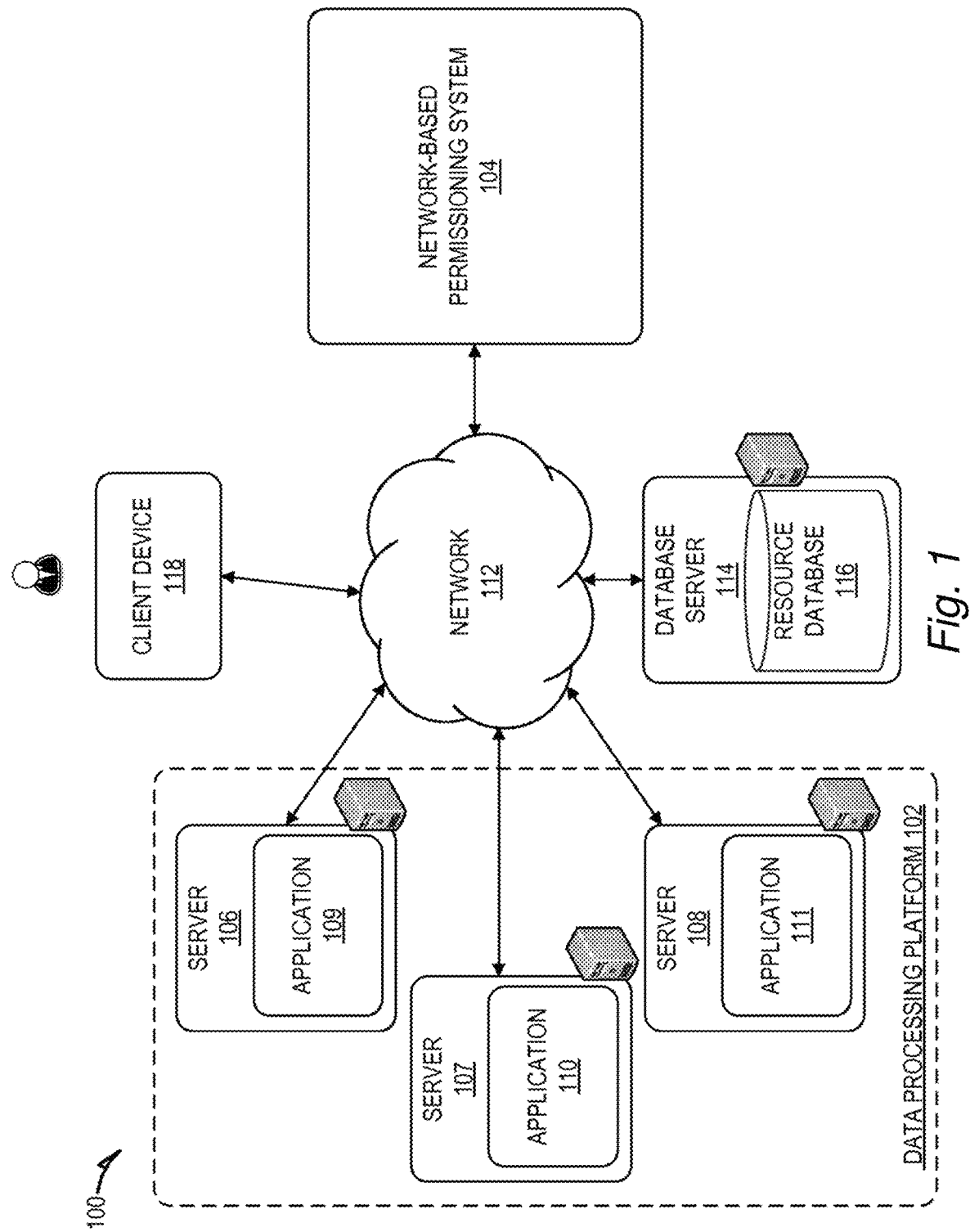
FIG. 1 is a block diagram illustrating a network system comprising a group of application servers of a data processing platform according to embodiments of this specification.

In brief, this specification describes methods and systems for data indexing for a search tool, for example a search tool associated with a data processing platform, or for example a cloud-based data processing platform storing and executing multiple data resources for multiple users.

The methods and systems involve providing a predetermined application program interface (API) for implementation in relation to one or more data resources requiring their data to be indexed for subsequent searching using a search tool.

The API may be configured such that, when implemented in relation to the data resource, which may be performed by a system associated with the data resource, to send data indicative of one or more definitions of data to be crawled from said data resource to an indexing system of the data processing platform, and to generate an event queue indicative of one or more events associated with said defined data that have occurred in relation to the data resource.

The methods and systems may then identify that one or more data resources have implemented the API, and queries the identified data resources to determine one or more events indicated in their event queue.

The methods and systems may then crawl the one or more identified data resources based on the determined one or more events to obtain data for indexing.

The methods and systems may then index data associated with said one or more events for access by a search tool.

The API, in essence, is provided as a dedicated API which may be exposed to any data resource on a given platform. The data resources may include, for example, any form of executable software, data set, or data structure usually, but not exclusively for providing a service, for example a data analysis application, a data transformation application, a report generating application, a machine learning process, a spreadsheet or a database. The API may be a downloadable stand-alone interface or a web API. The API may be public or private. The API allows data resources to communicate with a centralised crawling function, in accordance with routines and/or protocols of the centralised crawling function defined by the API, informing the centralised crawling function that it wants to be crawled and the type of data that it wants crawled for subsequent indexing and searching. Other data may be specified, as will be explained. The centralised crawling function may thereafter periodically check each identified data resource that implemented the API to determine if events are stored in the event queue. The events need not specify the data itself, but merely enables identification of an event that may be crawled to derive the searchable data for indexing.

In this way, new data resources may indicate their readiness for being indexed and searchable simply by implementing the exposed API, which also ensures that routines and/or protocols of the crawling and indexing service are adhered to. No manual updating is needed at the crawling and indexing service.

In the context of the following, the following definitions may apply.

A data resource is any form of software, data set, or data structure usually, but not exclusively for providing a service, for example a data analysis application, a data transformation application, a report generating application, a machine learning process, a spreadsheet or a database.

A search service, or search engine, is any form of software function or method by which stored data can be crawled and indexed for subsequent searching by means of a user interface which accepts user inputs, such one or more search terms which may be entered using alphanumeric text, and outputs a list of one or more search results.

Crawling is the process by which search services discover data for indexing, such as any filenames, constituent data, metadata, images, attributes, specifications, author names, dates, files sizes and/or contextual data relating to the data. Crawling is a known method which typically employs crawlers, bots or spiders which follow an algorithmic process to determine what to crawl, and when.

Indexing is the process by which data which is discovered during crawling is stored in one or more databases. Indexing may comprise organising the data in a particular way so that it can be searched, for example by arranging pages of a website in a hierarchical order for determining importance. An indexing service is any processing system which receives crawled data and stores it in an organised or structured way for searching.

A dataset, sometimes used interchangeably with data, holds data on the data processing platform, and usually has an accompanying schema for the dataset in order to make sense, or interpret, the data within the dataset.

A schema defines the structure of the data, e.g. in a dataset or other document such as a website, database or word processing document, spreadsheet, PDF document etc. For example, in a database dataset, the column names of the data set and the type of data in each column may comprise the schema. Sometimes, it is possible to infer or guess the schema, particularly for straightforward datasets or documents.

An event is any occurrence of a change in data, including the creation of new data, deleting of data, modification of existing data, including, but not limited to, a change in file name, adding or changing metadata or schemas etc.

An event queue is a buffer or similar data storage means for recording events in the order in which they occur, e.g. chronologically.

An API is any form of exposed interface which permits computers to communicate with other computers according to predefined rules/protocols. An exposed interface is one that can be accessed without requiring initial permission from the provider of the interface, for example by means of a URL. In the context of this disclosure, an API may be exposed for prompting the input of data indicative of one or more definitions of data to be crawled in relation to a data resource, for subsequently sending to the indexing service and implementation of that API service may expose a predetermined interface to one or more users or user computers for them to define the type of data to be crawled for indexing, and for implementing the user interface which tells a crawling and indexing service that it wants to be crawled and indexed. Implementation may by any known means, for example by user selection of a save, commit or implementation function. The API may be a stand-alone API or a web API, and may be public or private.

The data processing platform for which the data indexing methods and systems may be employed may be an enterprise software platform associated with an enterprise platform provider. An enterprise software platform enables use by multiple users, internal and external to the enterprise platform provider. The users may be users of different respective organisations, such as different commercial companies.

The data resources stored on the software platform may relate to technical data and/or technical processes. For example, an engine manufacturer may create and store a database relating to spare parts for the different models of engines it produces and services. The database may, for example, be a multi-dimensional relational database. Certain analyses may be performed on the database using another application, for example an executable application resource for analysing and/or transforming the data in order to identify trends which may be useful for predicting when certain parts will fail and/or need replacing.

For this purpose, the software platform may comprise enterprise applications for machine-analysis of data resources. For example, an organisation may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault.

History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, may records messages generated by controllers, processors or similar devices which are integrated into the component sub-systems of the machine. The messages may include a date and time, an identifier of a component sub-system, and message content such as, for example, warning information of information identifying a fault.

The above application is mentioned by way of example.

The software platform on which the data resources are stored and executed may be a proprietary or open source platform, which offers advantages in terms of time-to-deploy on the platform provider's hardware, as well as offering partitioning of data and rolling upgrades. An example open source platform is Kubernetes, which is particularly suited for automated deployment, scaling and management of applications. Such software platforms may employ containerised data resources.

In this regard, a containerised data resource comprises "containers" which hold one or more applications, and associated data libraries, that are guaranteed to be co-located on the same host machine and which can share resources.

Such software platforms may also provide a set of primitives which collectively provide mechanisms for deploying, maintaining and scaling applications. A basic scheduling unit may be called a pod. A pod may consist of one or more containers.

The conventional method of data indexing for a search tool is for the data processing platform provider to provide a centralised crawling and indexing system which initiates periodic crawling of its users' data resources, and indexes the crawled data for the subsequent processing of entered search terms. The methodology by which data is crawled and indexed is specified in a crawling and indexing function of the centralised system, which therefore needs to be programmed such that it knows which data resources, e.g. applications, database, services, it needs to crawl, what those data resources are, how the data resources are to be crawled and, in some cases, who can search for data of the particular data resources.

The conventional method is not scalable, because each time a new data resource is added to the system, the crawling and indexing service needs to be manually re-programmed to identify the new data resource, how to interpret its data, and how to index its data etc. This may take a finite period of time, and introduce delays into the system. It also does not cater well for future types of data which may be stored and implemented on the cloud computing platform. It also places a heavy processing burden on the centralised system which may become slow and/or slow down processing of other services on the cloud computing service.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications may be associated with a second, different organisation. These other applications may be provided on one or more of the application servers 106, 107, 108 which need not be specific to a particular organisation. Where two or more applications are provided on a common server 106-108 (or host), they may be containerised which as mentioned above enables them to share common functions.

Each of the servers 106-108 may be in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may stores other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 106. The client device 118 communicates and exchanges data with the data processing platform 102

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
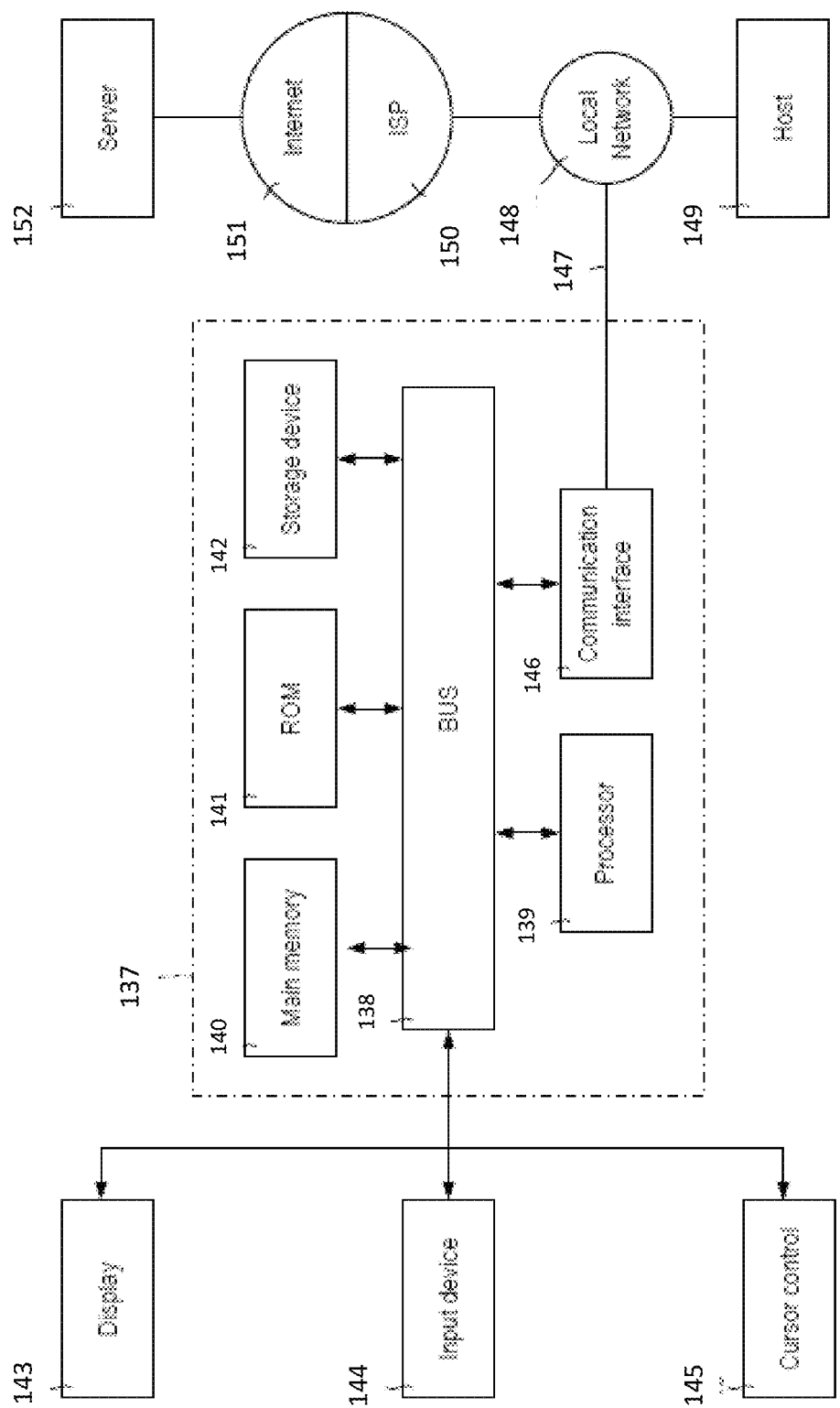
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

The data processing platform 102 may be a containerised data processing platform.

In this regard, a containerised data platform comprises "containers" which hold one or more applications, and associated data libraries, that are guaranteed to be co-located on the same host machine and which can share resources. Such software platforms may also provide a set of primitives which collectively provide mechanisms for deploying, maintaining and scaling applications. A basic scheduling unit may be called a pod. A pod may consist of one or more containers.

Figure 3:
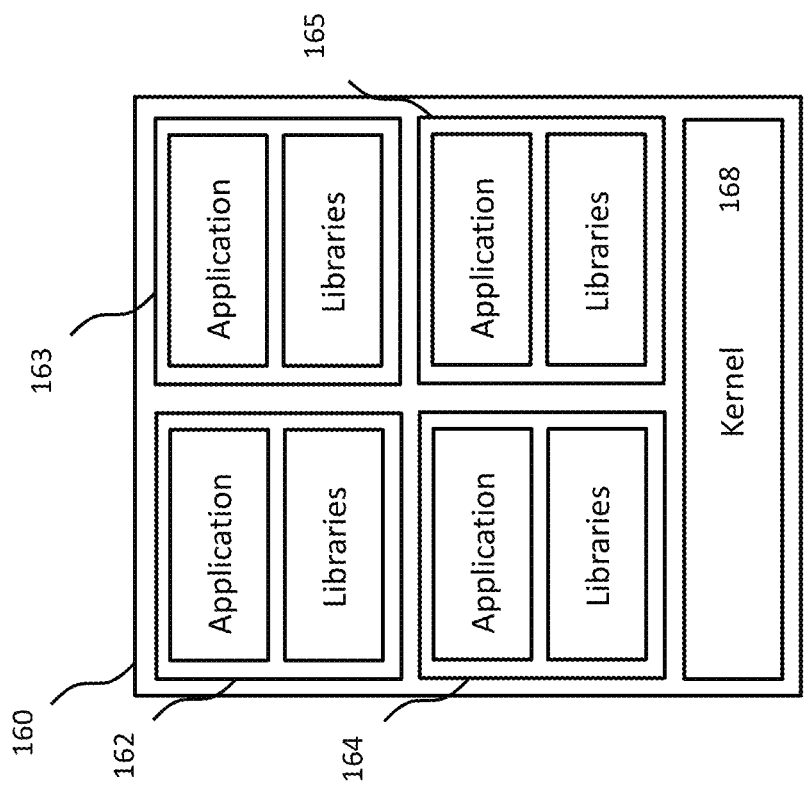
FIG. 3 is a schematic diagram of a container of a containerised computer platform according to embodiments of this specification.

For example, FIG. 3 is a schematic view of a container 160 of a containerised data processing platform. The container 160 in this case comprises first to fourth applications 162, 163, 164, 165, each having an associated library of functions, and a kernel 168. One or more of the first to fourth applications 162-165 may form part of a pod. For example, the first to third applications 162-164 may comprise a first pod and the fourth application 165 may comprise a second pod. For example, the first pod may comprise a first external organisation's applications, whereas the second pod may comprise a second external organisation's applications. Either way, the first and second pods run in the same kernel, in this example.

Figure 4:
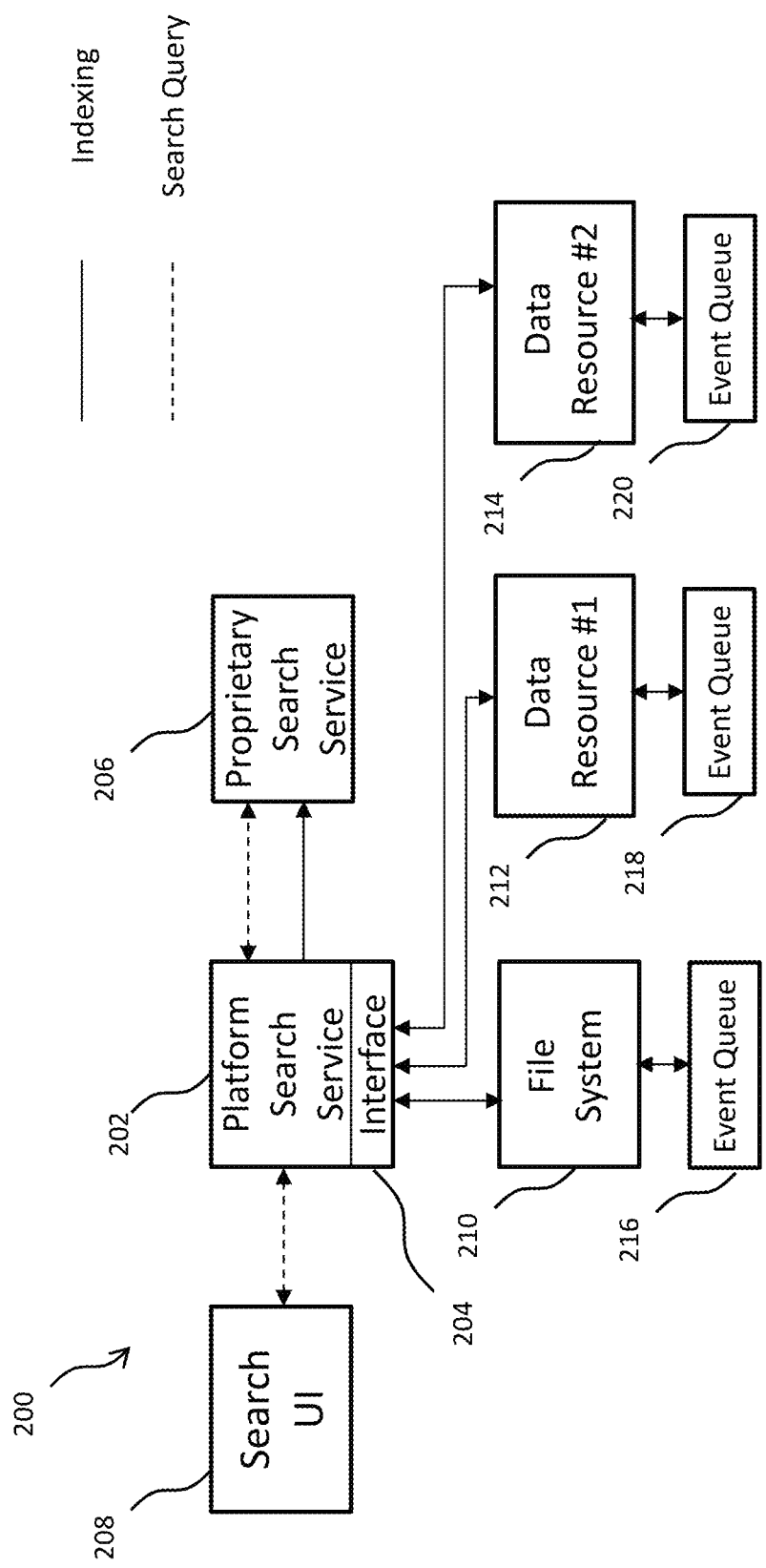
FIG. 4 is a block diagram of functional components in relation to a platform search service, according to embodiments of this specification.

In accordance with an example embodiment, and referring now to FIG. 4, which shows example architecture 200, one of the application servers 106 in the data processing platform shown in FIG. 1 may comprise a platform search service 202, specific to the data processing platform 102. The platform search service 202 may be implemented using software, hardware or a combination of both.

The platform search service 202 may have an associated interface 204, for example an API, which may be a stand-alone API or a web API. For the purposes of the foregoing, we assume a web API is employed. A web API is an API for either a web server or a web browser. It exposes one or more endpoints to a defined request-response message system, typically expressed in JavaScript Object Notation (JSON) or Extensible Markup Language (XML), via the web, most commonly by means of an HTTP based web server. The interface 204 may effectively be a web-page delivered, when requested, to one or more data resources for them to communicate with the platform search service 202 using the routines/protocols defined by the interface.

Associated with the platform search service 202 is a proprietary search service 206. The proprietary search service 206 may be any Off-the-shelf system configured to index data received from the platform search service 202. The proprietary search service 206 may also be configured to receive search terms entered using a search user interface 208 for providing search results via the platform search service 202. For example, the proprietary search service 206 may be Elasticsearch™ which is a distributed JSON-based search and analytics engine offered by Elasticsearch Global BV. The algorithms by which the proprietary search service 206 indexes and searches data is outside the scope of the present embodiments, which is concerned with providing data for indexing to the proprietary search service.

The interface 204, as mentioned above, may be publicly exposed to data resources on the data processing platform 102 shown in FIG. 1. More particularly, users of the data resources may, via their own user terminals, which may be external to the data processing platform 102, select to implement the interface 204 in relation to one or more of their data resources. This may require authentication and/or authorisation of the user, for example limiting the interface implementation only to particular users associated with the relevant data resource and/or users having particular pre-defined roles.

For example, as shown in FIG. 4, three data resources are shown, comprising a file system 210, a first 'other' data resource 212 and second 'other' data resource 214. The file system 210 may be the file system of the data processing platform 102, i.e. a windows-based operating system that enables users to view their data resources, their organisation's data resources and to modify data resources by creating, deleting and/or modifying data resources or data within the data resources. These operations may be conditional on the above-mentioned authentication and/or authorisation. The first and second data resources 212, 214 may be any other type of data resource, for example any form of executable software, data set, or data structure usually, but not exclusively for providing a service, for example a data analysis application, a data transformation application, a report generating application, a machine learning process, a spreadsheet or a database.

Users wishing to have a new data resource, e.g. the second data resource 214, crawled and indexed by the platform search service 202 implement the exposed interface 204. In the context of web APIs, the interface 204 may be a web page displayed to the user, requesting identification of the new data resource 214 and a definition of the type of data to be crawled and indexed.

The interface 204 ensures that the information provided by the user conforms with the routines/protocols required by the platform search service, for example the definition, the type of signalling used and so on. The interface 204 may be in the form of a web-page or similar, but this is not essential. By defining the data to be crawled, the platform search service 202 can interpret the data in such a way that the data resource can be indexed appropriately.

The interface 204 may be implemented for the new data resource 214 by applying or sending the data to the platform search service 202, which may be by means of a single-click input or similar.

Once the interface 204 is implemented for the new data resource 214, the platform search service 202 is configured periodically to query that data resource, e.g. using an automated spider or bot, to acquire data for indexing. That is, the platform search service 202 invokes the querying of the new data resource 214 and indeed any other of the data resources 210, 212 that have implemented the interface 204. Periodic querying may be done on a predetermined basis, e.g. once per day, once per week, or may be randomised.

Further, the interface 204 when implemented for the new data resource 214, causes it to generate and update a local event queue 220. The local event queue 220 may be a buffer which stores data indicative of events occurring in relation to the data resource 214. An event is any occurrence of a change in data, including the creation of new data, deleting of data, modification of existing data, including, but not limited to, a change in file name, adding or changing metadata or schemas etc.

In FIG. 4, each of the data resources 210, 212, 214 have associated respective local event queues 216, 218, 220.

When an event occurs, the type of event and what it relates to may be added to the queue. An event queue is a small library for transactionally appending to and reading ordered sequences of items. For example. the queue represents a chronological list of events, and may or may not include date/time information. In some embodiments, the event may simply be a resource locator, pointing to the relevant data, e.g. the new data, the deleted data, the modification of existing data etc.

The platform search service 202, when querying the or each data resource 210, 212, 214, looks at the local event queues 216, 218, 220 of each to identify what needs to be crawled for indexable data. In the case of a newly created data resource 214, all data in the local event queue 220 is retrieved and subsequently crawled for indexing. In the case of a data resource, e.g. the first data resource 212, the platform search service 202 only needs to identify new events that have occurred since the last query operation. This may be performed by deleting events from the local event queue 216, 218, 220, once identified, so that all events appearing subsequently in said queues are new events. Alternatively, each local event queue 216, 218, 220 may maintain a time offset, for identifying to the platform search service 202 which events have occurred since the last query operation.

The local event queues 216, 218, 220 may be stored locally with the associated data resource 210, 212, 214 or may be stored at the platform search service 302 location.

Thus, it will be appreciated that a centralised platform search service 202 is provided that does not require updating or processing to cater for new data resources 216, 218, 220 or changes to data types within existing data resources. Rather, by exposing the interface 204, which defines how data resources or data types are to be defined to the platform search service 202 and for configuring local event queue(s), a scalable solution is provided for crawling, indexing and searching which does not require significant resources at the platform search service, and nor does it risk damaging or corrupting the platform search service if improperly used.

In FIG. 4, the solid lines represent the indexing operations whereby the data resources 210, 212, 214 are crawled for data and indexed, which may use any existing crawling/indexing algorithm and may take place within the platform search service 202 or the proprietary search service 206. The dashed lines represent the processing search queries, which are sent from the search UI 208 via the platform search service 202 to the proprietary search service 206.

Figure 5:
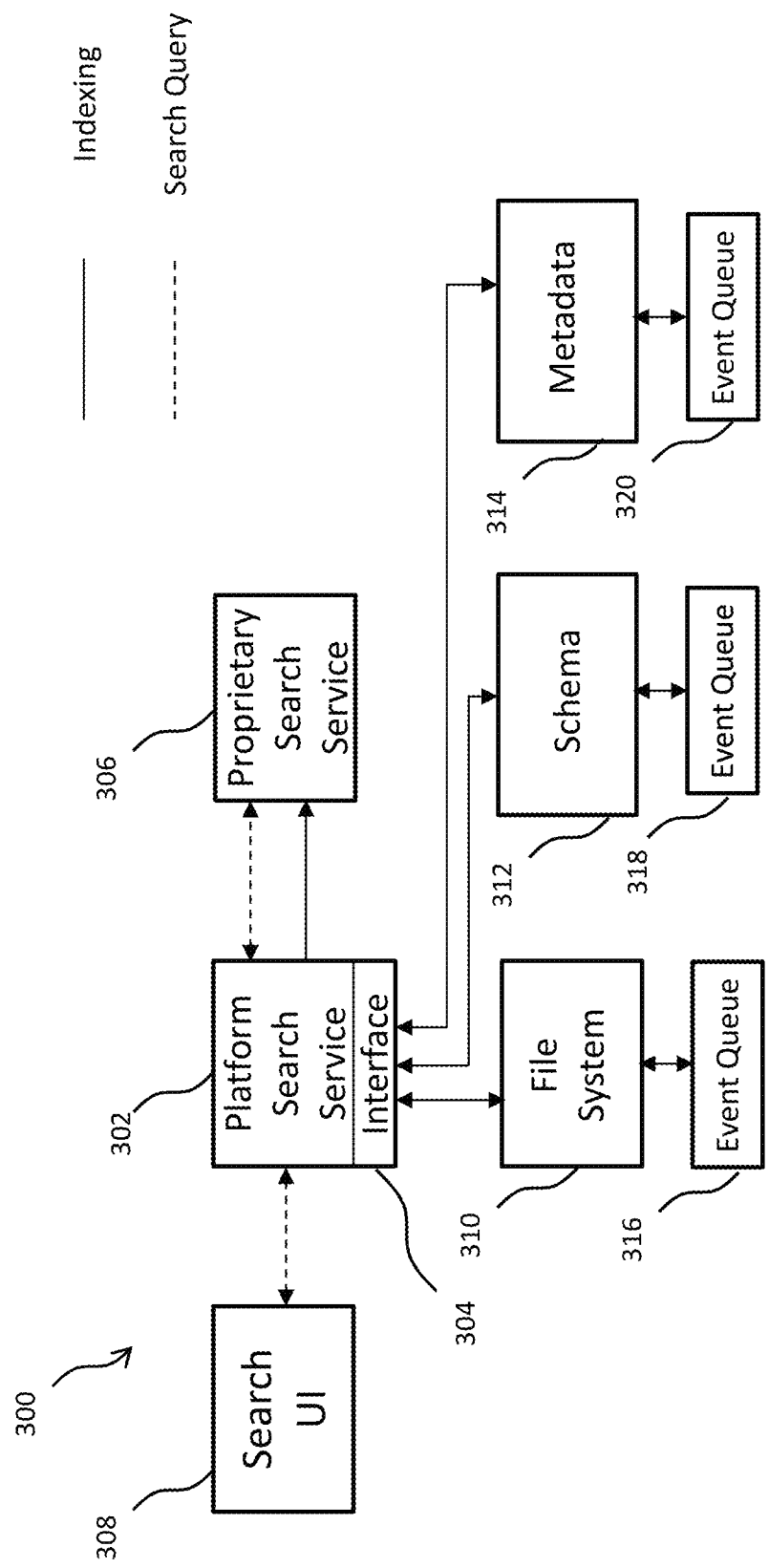
FIG. 5 is a block diagram of functional components in relation to a platform search service, according to another embodiment of this specification.

In accordance with another example embodiment, and referring now to FIG. 5, which shows another example architecture 300, the platform search service 302, the interface 304, the proprietary search service 306, and the search UI 308 may be the same as the correspondingly-named elements shown in FIG. 4. In this case, the data resources comprise a file system 310, a set of schemas 312 and metadata 314. Each of the file system 310, schemas 312 and metadata 314 represent alternative groupings of data that can be crawled, indexed and searched in a similar manner to that described above.

Figure 6:
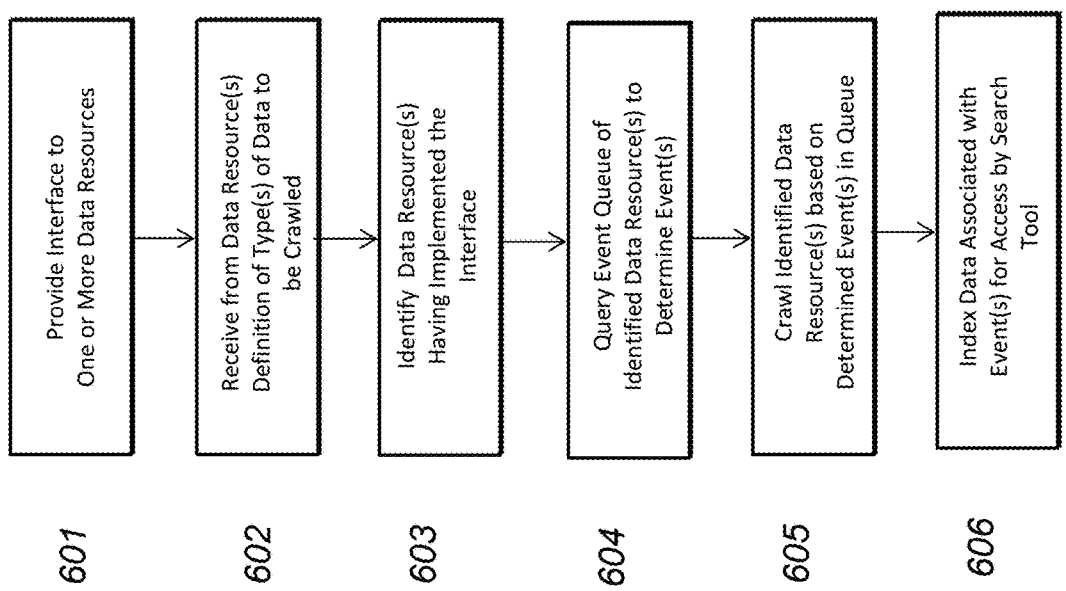
FIG. 6 is a flow diagram showing processing steps that may be performed by the platform search service represented in FIGS. 4 and 5 according to embodiments of this specification.

FIG. 6 is a flow diagram showing processing operations that may be performed by the platform search service 302 when implemented on a processor 139 shown in FIG. 2. The processing operations may represent program instructions stored on one or more of the ROM 141, main memory 140 or ROM 141 of, in this example, the server 106 of the data processing platform 102. In the foregoing, the numbering of the processing operations is not necessarily indicative of the required order to operations, and re-ordering may be employed. Not every operation may be required in some situations.

A first operation 601 comprises providing (or exposing) an interface to one or more data resources.

A second operation 602 comprises receiving from the one or more data resources a definition of one or more types of data to be crawled.

A third operation 603 comprises identifying one or more data resources having implemented the interface.

A fourth operation 604 comprises querying the event queue(s) of the one or more data resources to determine event(s.)

A fifth operation 605 comprises crawling the one or more identified data resources based on the determined event(s) in the event queue(s.)

A sixth operation 606 comprises indexing data associated with the event(s) for access by a search tool.

Figure 7:
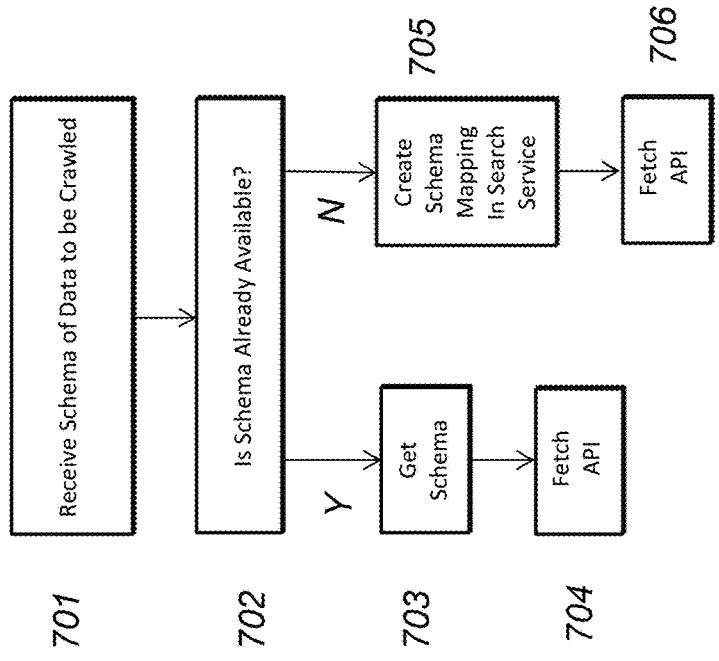
FIG. 7 is a flow diagram showing further processing steps involved in one of the FIG. 6 steps according to embodiments of this specification.

FIG. 7 is a flow diagram showing processing operations that may be performed by the platform search service 302 as part of the operation 602 when implemented on a processor 139 shown in FIG. 2. The processing operations may represent program instructions stored on one or more of the ROM 141, main memory 140 or ROM 141 of, in this example, the server 106 of the data processing platform 102. In the foregoing, the numbering of the processing operations is not necessarily indicative of the required order to operations, and re-ordering may be employed. Not every operation may be required in some situations.

In this case, operation 602 may comprise receiving a schema identifying the data to be crawled and the format of that data, so that the platform search service 302 may interpret the data to be crawled for indexing.

A first operation 701 comprises receiving a schema of data to be crawled.

A second operation 702 comprises determining if the schema is already available at the platform search service. In this respect, if the schema is already available locally, then operation 703 may comprise getting the schema and operation 704 may comprise fetching an API appropriate for that schema. If not, an operation 705 may comprise creating a schema mapping in the platform search service 302 and an operation 706 of fetching an API appropriate for that schema. In this case, the API is appropriate for interpreting the data to be crawled for indexing.

Figure 8:
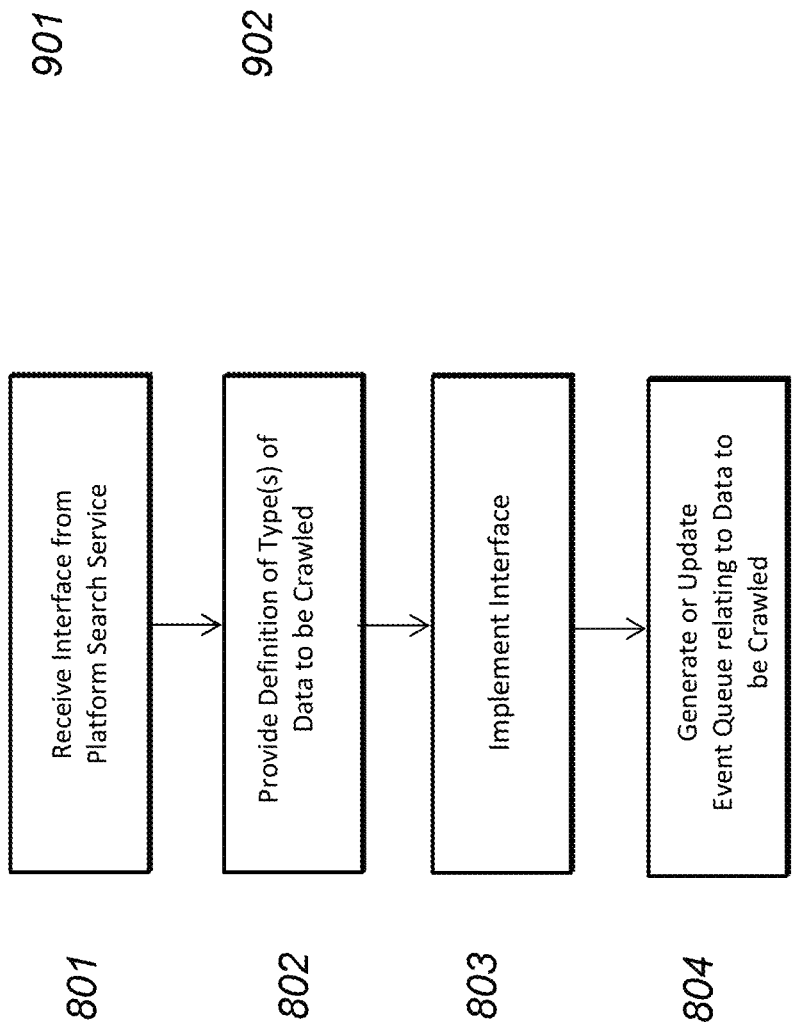
FIG. 8 is a flow diagram showing processing steps that may be performed at a data resource when interacting with the platform search service represented in FIGS. 4 and 5, according to embodiments of this specification.

FIG. 8 is a flow diagram showing processing operations that may be performed by one of the data resources 310, 312, 314. The processing operations may represent program instructions stored on one or more of the ROM 141, main memory 140 or ROM 141 of, in this example, the server 106 of the data processing platform 102 or indeed any of the other servers 107, 108, 114 that may store the relevant data resources. In the foregoing, the numbering of the processing operations is not necessarily indicative of the required order to operations, and re-ordering may be employed. Not every operation may be required in some situations.

A first operation 801 comprises receiving an interface from a platform search service.

A second operation 802 comprises providing a definition of the type(s) of data to be crawled to the platform search service via the interface.

A third operation 803 comprises implementing the interface. This may be by means of submitting the data provided in the second operation 8.2 or selecting an "apply" or "implement" button on a UI.

A fourth operation 804 comprises generating or updating an event queue relating to data to be crawled.

Figure 9:
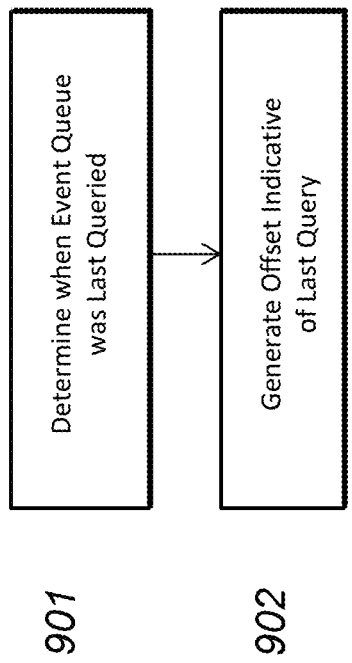
FIG. 9 is a flow diagram showing processing steps that may be performed at platform search service when updating an event queue, according to embodiments of this specification.

FIG. 9 is a flow diagram showing processing operations that may be performed by the platform search service 302 in response to receiving a query in operation 604 of FIG. 6. The processing operations may represent program instructions stored on one or more of the ROM 141, main memory 140 or ROM 141. In the foregoing, the numbering of the processing operations is not necessarily indicative of the required order to operations, and re-ordering may be employed. Not every operation may be required in some situations.

A first step 901 comprises determining when the event queue was last queried.

A second step 902 comprises generating an offset indicative of the last query for use by the platform search service. FIG. 9 indicates therefore that, rather than data resources pushing notifications to the platform search service 302, as in FIG. 6, the platform search service 302 may periodically poll the event queue of each data resource.

FIG. 10a is an example GUI 400 of the file system 210 which is useful for understanding example embodiments. The GUI 400 is presented to registered users of the data processing platform 102, usually after they have entered login details and a password which is verified by the network-based permissioning system 104 shown in FIG. 1.

The GUI 400 comprises an upper menu bar 402 comprising of three pull down menus for "home" 404, "files" 406, and "tools" 408 and a search UI 410 comprising an alphanumeric text entry box. All have their ordinary meaning in the art. A left-hand side 412 of the GUI 400 comprises a menu for the user to select particular data to view in a main window 400. For example, the left-hand side 412 may display "data catalog", "all files", "favourites", "shared" and "trash" all of which have their ordinary meaning in the art. In the main window 400 are shown a plurality of data resources 416 to which the particular user has access. In this case, the user is presumed to be an employee of an engine manufacturing company and views data resources 416 relating to his or her work. These may include any type of data resource, for example databases relating to different types of engine build, schemas defining the format of the engine build databases, and reports relating to analysis results for the engine builds, to give some examples. The main window 400 may, in addition to showing the names of the data resources 416, may show metadata such as the last time the relevant data resources were accessed, and the type of resource they comprise, e.g. database, schema, word document, to give some examples. In normal use, the user may select individual data resources to access the underlying data and, if permitted by the network-based permissioning system 104, may edit and/or delete data from within the data resources 416.

The user may select one or more items from the GUI 400 by means of a selection tool such as a cursor or arrow 418 which is moved in accordance with keyboard input or the movement of a mouse or trackball.

In the shown example, the user may wish to make a newly-created one of the data resources 416, particularly an "Engine 1" database 420, available to the platform search service 202 so that data from within the "Engine 1" database can be crawled and indexed for subsequent searching by means of the search UI 410. The user may select the "Engine 1" database 420 by clicking or otherwise selecting the relevant item in the GUI 400. In some embodiments, a plurality of such data resources may be selected, for example by holding the shift-key whilst selecting data resources.

In this respect, it may be that a user, e.g. the creator of a data resource may not wish that data resource to be searchable until a later time. This may be because the data contained within the data resource may currently be confidential, sensitive or unverified, for example.

Referring to FIG. 10b, the user (or any user authorised to do so by the network-based permissioning system 104) may commence the process of making the data resource "Engine 1" 420 searchable by first selecting the "tools" item 408 from the menu bar 402. The "tools" item 408 may comprise a plurality of different selectable tools relating to data resources on the data processing platform 102, one of which is a "make searchable" tool 422. Selection of the "make searchable" tool 422 is in this embodiment effective to access the exposed interface 204 shown in FIG. 3. For example, a URL may be requested from the platform search service 202 which corresponds to the exposed interface 204.

Referring to FIG. 10c, responsive to selection of the "make searchable" tool 422, a web page 430 is shown, which may or may not be embedded within the GUI 400. The web page 430 represents a web API to the platform search service 202 and may be common to all data resources wishing to be made searchable in this context. The web API 430 ensures data is sent in the required format for the platform search service 202.

Within the web API 430 is provided a number of fields for data entry, one or more of which may be automatically populated.

Figure 10:
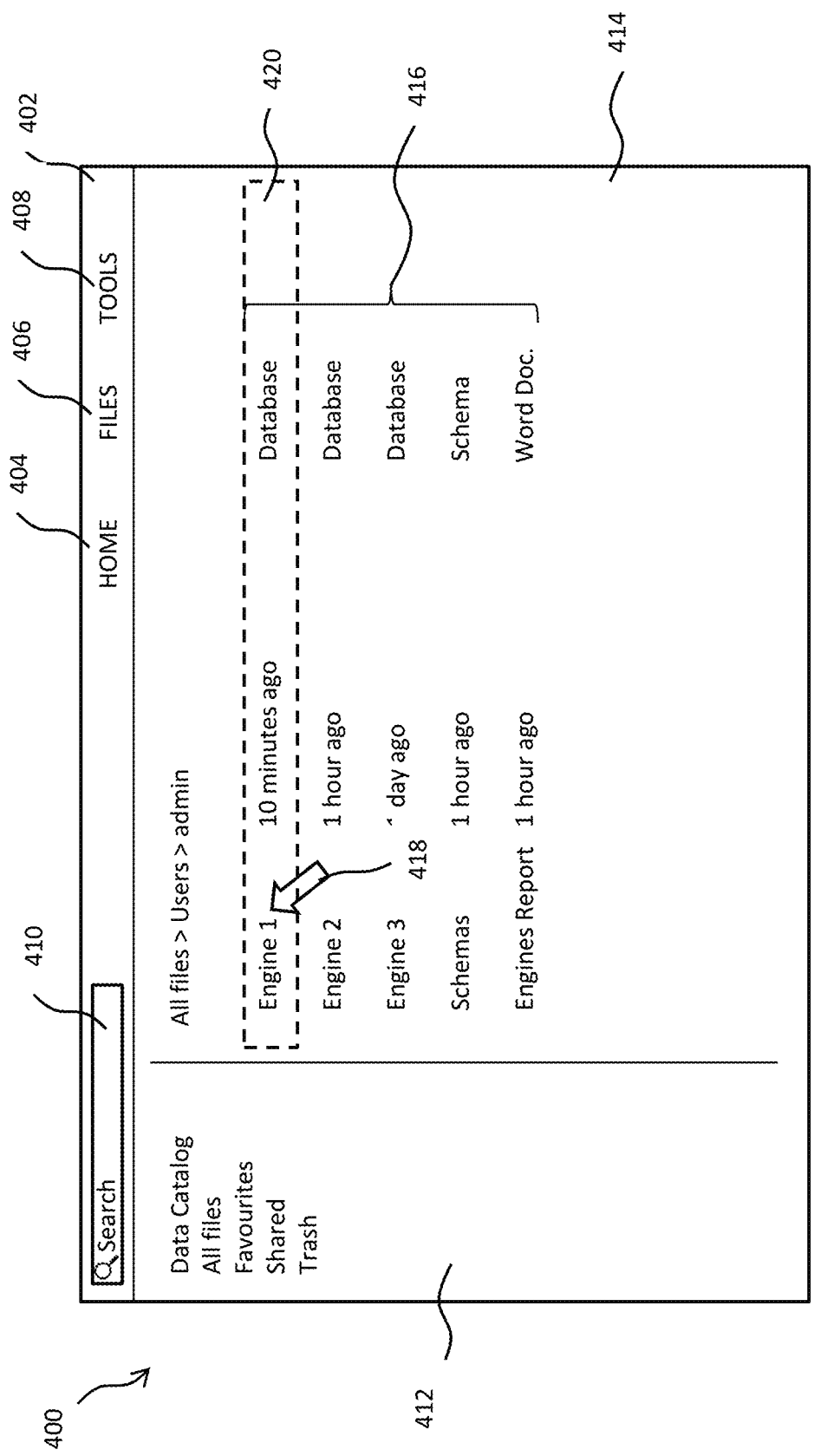
FIGS. 10a-10d show user interface diagrams representing visual output of a user interface of the platform search service, according to embodiments of this specification.
Figure 10:
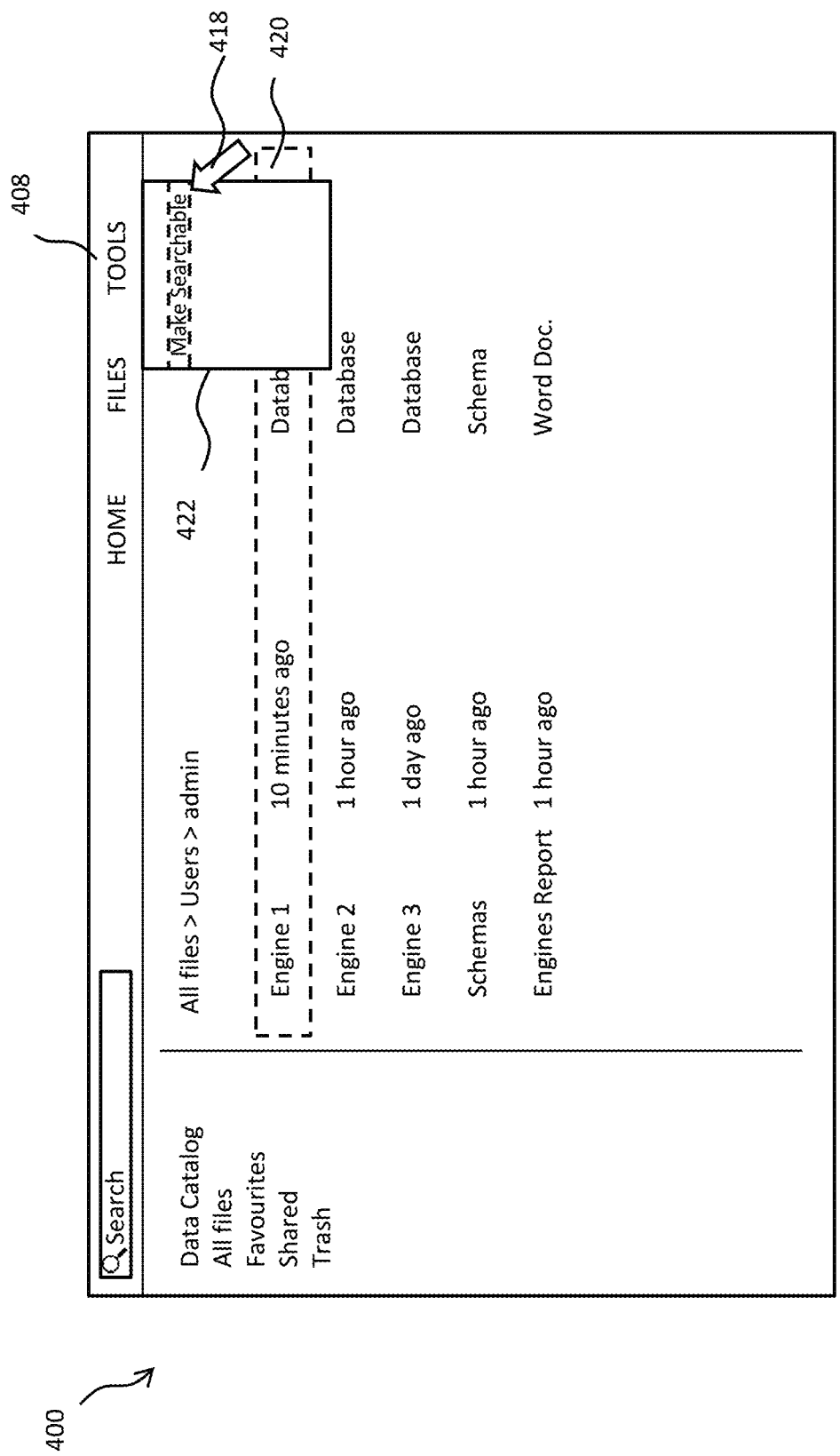
Figure 10:
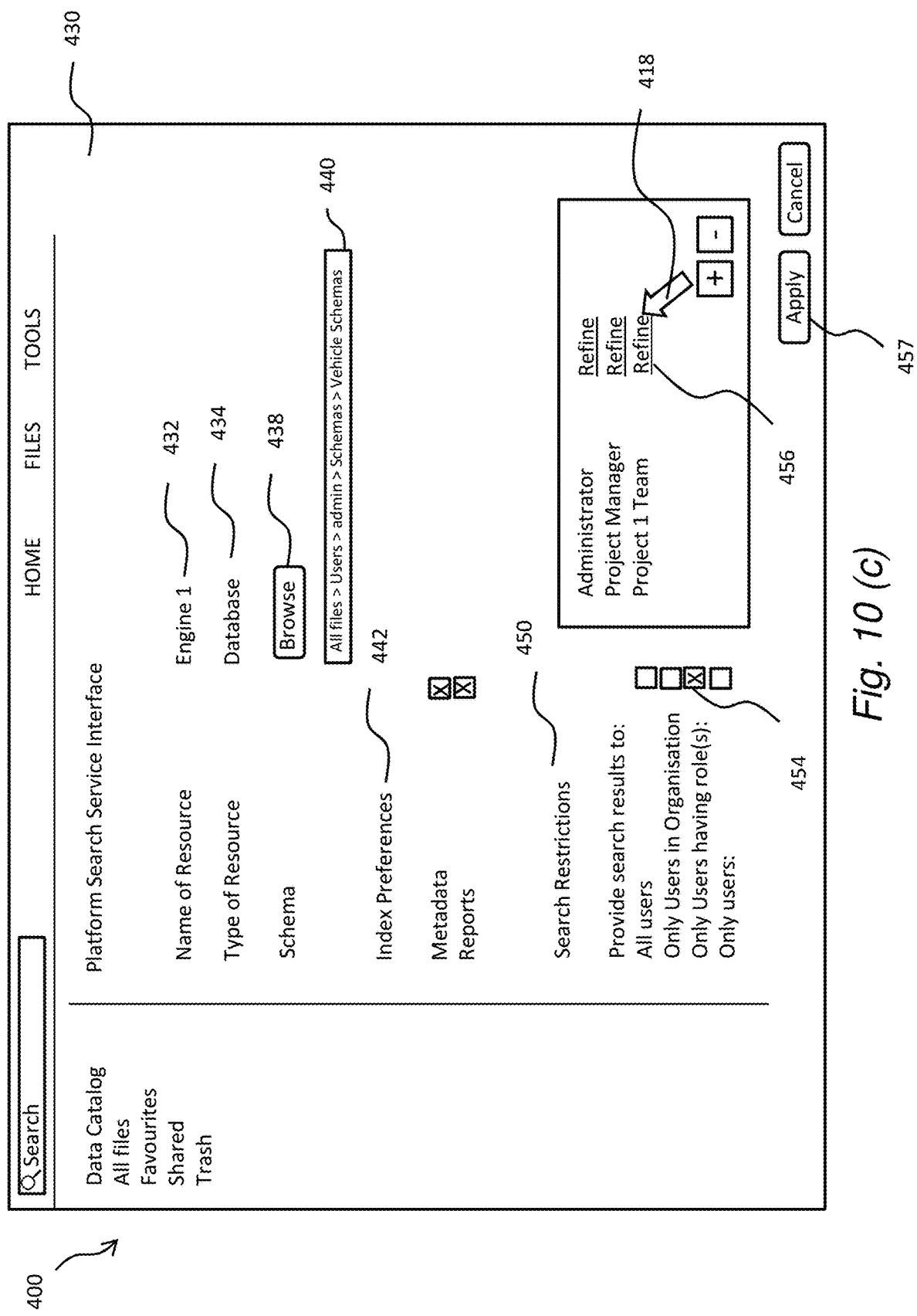
Figure 10:
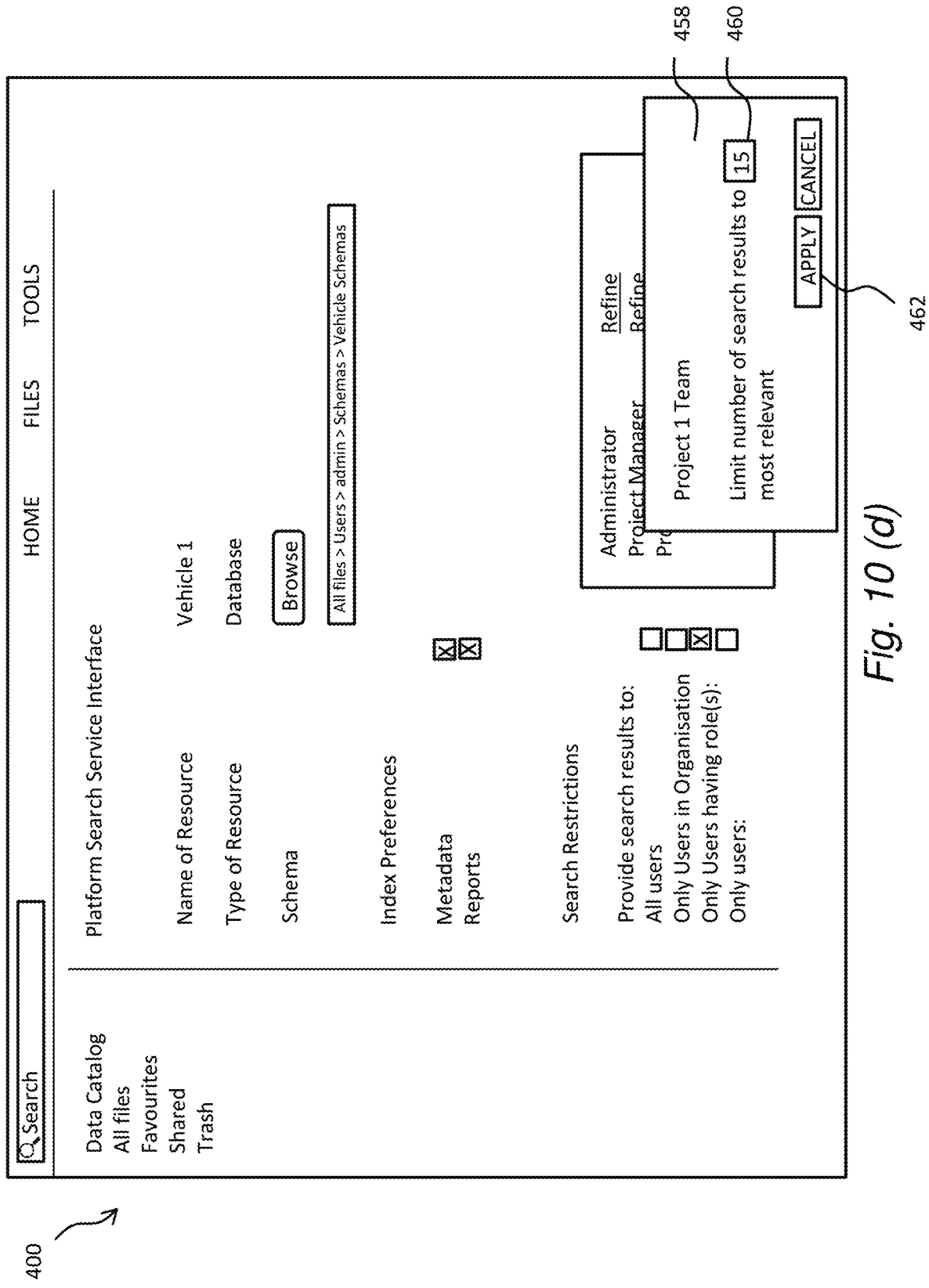

For example, a first field 432 indicates the name of the data resource "Engine 1" which may be automatically populated based on the selection operation shown in FIG. 10. Alternatively, a different name may be provided.

For example a second field 434 indicates the type of resource "Database" which may be automatically populated based on the selection operation in relation to "Engine 1" which has metadata identifying it as a database.

For example, a third field 436 may indicate a schema associated with the "Engine 1" resource. This may be required in order for the platform search service 202 to interpret the "Engine 1" database, i.e. to be able to understand what each row and/or column and/or constituent field, amongst other data. For this purpose, a selectable "browse" button 438 may be provided for the user to select the relevant path 440 to a stored schema corresponding to the "Engine 1" database. Alternatively, the path 440 may be manually entered. Alternatively still, in some embodiments, the schema itself may be entered manually.

For example, another part 442 of the web API 430 may enable the input of indexing preferences. By default, indexing of the selected data resource may comprise indexing the file name and any keywords appearing in the data resource. If additional data is required for indexing, for example metadata associated with the data resource, constituent data of the data resource, or reports deriving from the data resource, then appropriate selection may be made using check boxes as shown.

For example, another part 450 of the web API 430 may enable the input of search restrictions. By default, users identified as belonging to an organisation by means of the network-based permissioning system 104 are able to search all data resources associated with that organisation. However, it may be desirable to impose certain restrictions on what is searchable, depending on the identity of the user, which may be based on their name or their role. The web API 430 may enable this. For example, selection of one or more options may permit search results only to be made available to all users (across the data processing platform 102), or only to users having a particular role, or only to a particular subset of users identified by name. Indeed, any method for filtering which users can search the data resource can be employed, and multiple methods can be used in combination. In the shown example, selection of "only users having role(s)" box 452 is made, causing a selection box 454 to appear in which a subset of predefined user roles can be specified. For example, only administrators, project managers and project 1 team roles are permitted to receive search results in the shown example.

Furthermore, within particular role groups, further refinement may be provided by means of selecting the "refine" item 456.

Referring to FIG. 10*d*, for example, responsive to selection of the "refine" item 456 associated with "Project 1 Team" the user is presented with the option of limiting the number of search results to a predefined maximum number, which may be entered in the alphanumeric text box 460. Alternative or additional refinement options may be presented, for example for refining the number of search results for particular members of the "Project 1 Team" or applying further restrictions, such as blocking search results for which metadata contains the keyword "Management Only" or "Restricted." Numerous examples may be conceived in this context.

Selection of an "Apply" button 462 will apply the selected refinements to the current web API 430 for the current data resource "Engine 1" and returns the GUI shown in FIG. 12. Alternatively, selection of the "cancel" button 464 will cancel the current selections.

Returning to FIG. 10*c*, regardless of what index preferences 442 and search restrictions 450 are selected, if any, the web API 430 for the current data resource "Engine 1" is implemented by selecting the "Apply" button 457.

Responsive to selecting the "Apply" button 457, the submitted information is sent to the platform search service 202 which updates a local database with said information and adds the "Engine 1" resource to its list of data resources to be crawled in accordance with its internal crawling and indexing algorithms.

Furthermore, the "Engine 1" resource creates its own local event queue for storing events relating to the resource and its constituent data, so that the platform search service 202 may periodically query the local event queue to derive data relating to new events for crawling and indexing. The platform search service 202 subsequently makes use of the data type "database" to locate an appropriate API for interpreting the data to be crawled. If a schema is provided with the web API 430, the schema may be used to select a particular API specific to that schema, or in some cases, may be required to estimate or predict what certain parts of the database refer to. In the first instance, directly following implementation of the web API 430 for the new "Engine 1" resource, all data in the data queue may be crawled, taking into account the index preferences.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

The invention claimed is:

1. A method of indexing data for a search service, wherein the method is performed using one or more processors, the method comprising:
   determining a schema of a data resource to be crawled;
   determining that the schema has changed;
   following the change of the schema, determining whether the changed schema is available at a search component of a platform that crawls the data resource;
   in response to determining that the changed schema is available at the compatible with a search component of the platform, retrieving a first application programming interface (API) appropriate for the changed schema, wherein the first API interfaces between the data resource and the search component;
   in response to determining that the changed schema is unavailable at the search component of the platform:
      creating, in the search component, a schema mapping corresponding to the data resource; and
      retrieving a second API appropriate for the schema mapping, wherein the second API interfaces between the data resource and the search component;
   implementing the search component to determine one or more events associated with the data resource;
   crawling, using the search component, the data resource based on the determined one or more events to obtain data; and
   indexing the obtained data associated with said one or more events for access by the search component.

2. The method of claim 1, further comprising detecting a change in an access control privilege of the data resource;

and the determining of the first schema is in response to detecting a change in the access control privilege.

3. The method of claim 2, wherein the change in the access control privilege comprises changing a searching privilege of the data resource from unsearchable to searchable.

4. The method of claim 1, further comprising:
prior to determining that the schema has changed:
retrieving a third API appropriate for the schema the search component;
implementing the search component to determine one or more second events associated with the data resource;
crawling, using the search component, the data resource based on the determined one or more second events to obtain second data; and
indexing the obtained second data associated with said one or more second events for access by the search component.

5. The method of claim 1, wherein the one or more events have occurred since a previous querying operation and are determined based on an offset indicative of the previous querying operation; and the crawling the data resource is based only on the one or more events that have occurred since a previous querying operation.

6. The method of claim 1, further comprising:
presenting the obtained data and metadata associated with the obtained data; and
selectively redacting the presentation of the obtained data based on a role of a viewer of the obtained data.

7. The method of claim 1, wherein the one or more events comprise a change in, addition or removal of metadata.

8. The method of claim 1, wherein the one or more events comprises a change in a file type of the data resource.

9. The method of claim 1, wherein the one or more events comprises an additional schema in the data resource.

10. The method of claim 1, further comprising populating an interface that includes details regarding the data resource, metadata, the schema or the change in the schema, access control properties, and indexing attributes.

11. A system comprising:
one or more physical processors;
a memory storing instructions that, when executed by the one or more physical processors, cause the system to perform:
determining a schema of a data resource to be crawled;
determining that the schema has changed;
following the change of the schema, determining whether the changed schema is available at a search component of a platform that crawls the data resource;
in response to determining that the changed schema is available at the search component of the platform, retrieving a first application programming interface (API) appropriate for the changed schema, wherein the first API interfaces between the data resource and the search component;
in response to determining that the changed schema is unavailable at the search component of the platform:
creating, in the search component, a schema mapping corresponding to the data resource; and
retrieving a second API appropriate for the schema mapping, wherein the second API interfaces between the data resource and the search component;
implementing the search component to determine one or more events associated with the data resource;
crawling, using the search component, the data resource based on the determined one or more events to obtain data; and
indexing the obtained data associated with said one or more events for access by the search component.

12. The system of claim 11, wherein the instructions further cause the system to perform:
detecting a change in an access control privilege of the data resource; and the determining of the first schema is in response to detecting a change in the access control privilege.

13. The system of claim 12, wherein the change in the access control privilege comprises changing a searching privilege of the data resource from unsearchable to searchable.

14. The system of claim 11, wherein the instructions further cause the system to perform:
prior to determining that the schema has changed:
retrieving a third API appropriate for the schema to interface with the search component;
implementing the search component to determine one or more second events associated with the data resource;
crawling, using the search component, the data resource based on the determined one or more second events to obtain second data; and
indexing the obtained second data associated with said one or more second events for access by the search component.

15. The system of claim 11, wherein the one or more events have occurred since a previous querying operation and are determined based on an offset indicative of the previous querying operation; and the crawling the data resource is based only on the one or more events that have occurred since a previous querying operation.

16. The system of claim 11, wherein the instructions further cause the system to perform:
presenting the obtained data and metadata associated with the obtained data; and
selectively redacting the presentation of the obtained data based on a role of a viewer of the obtained data.

17. The system of claim 11, wherein the one or more events comprise a change in, addition or removal of metadata.

18. The system of claim 11, wherein the one or more events comprises a change in a file type of the data resource.

19. The system of claim 11, wherein the one or more events comprises an additional schema in the data resource.

20. The system of claim 11, wherein the instructions further cause the system to perform:
populating an interface that includes details regarding the data resource, metadata, the schema or the change in the schema, access control properties, and indexing attributes.

* * * * *